(12) United States Patent
Arisawa (10) Patent No.: US 10,213,904 B2
(45) Date of Patent: Feb. 26, 2019

(54) GRINDING WHEEL TOOL

(71) Applicant: MITSUBISHI HEAVY INDUSTRIES MACHINE TOOL CO., LTD., Ritto-shi, Shiga (JP)

(72) Inventor: Hideaki Arisawa, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 91 days.

(21) Appl. No.: 15/038,294

(22) PCT Filed: Sep. 9, 2014

(86) PCT No.: PCT/JP2014/073728
§ 371 (c)(1),
(2) Date: May 20, 2016

(87) PCT Pub. No.: WO2015/098194
PCT Pub. Date: Jul. 2, 2015

(65) Prior Publication Data
US 2016/0288294 A1    Oct. 6, 2016

(30) Foreign Application Priority Data

Dec. 25, 2013 (JP) .................... 2013-266324

(51) Int. Cl.
*B24D 5/10* (2006.01)
*B23D 59/02* (2006.01)
*B24B 55/10* (2006.01)

(52) U.S. Cl.
CPC .............. *B24D 5/10* (2013.01); *B23D 59/025* (2013.01); *B24B 55/102* (2013.01)

(58) Field of Classification Search
CPC ... B23D 59/025; B24B 55/052; B24B 55/102; B24D 5/00; B24D 5/10; B24D 7/10; B24D 7/18; B24D 13/18
See application file for complete search history.

(56) References Cited

U.S. PATENT DOCUMENTS 2,819,568 A * 1/1958 Kasick ............... B24D 7/10
                                                  451/449
3,282,263 A * 11/1966 Christensen ......... B23D 59/025
                                                  125/15
(Continued)

FOREIGN PATENT DOCUMENTS

EP     2 324 945 A1    5/2011
JP     58-59765 A      4/1983
(Continued)

OTHER PUBLICATIONS

Official Action dated Jun. 6, 2017 issued in corresponding Japanese Patent Application No. 2013-266324 with an English Translation.
(Continued)

Primary Examiner — Timothy V Eley
(74) Attorney, Agent, or Firm — Birch, Stewart, Kolasch & Birch, LLP (57) ABSTRACT

This grinding wheel tool is provided with a cylindrically shaped head unit comprising a hollow area passing through the inside, and abrasive grains adhered across the entire outer peripheral surface of the head unit. A fluid is supplied in the hollow area, and in the head unit, communication holes are formed which communicate between the hollow area and the outer peripheral surface and which, from the radial direction of the head unit, are angled forwards in the direction of rotation. Hereby, it is possible to provide a grinding wheel tool which can greatly reduce clogging even (Continued)

in cases where a high amount of cutting chips are generated per unit time, such as in high-feed processing.

7 Claims, 6 Drawing Sheets

(56) References Cited

U.S. PATENT DOCUMENTS

| | | | | |
|---|---|---|---|---|
| 3,754,359 | A * | 8/1973 | Scandaletos | B24D 7/10 451/449 |
| 4,058,936 | A * | 11/1977 | Marton | B24B 55/102 451/359 |
| 5,846,125 | A * | 12/1998 | Robichon | B24D 5/10 125/11.22 |
| 5,993,297 | A * | 11/1999 | Hyatt | B24B 55/02 451/450 |
| 8,202,141 | B2 * | 6/2012 | Le Borgne | B24D 7/00 451/450 |
| 8,641,479 | B2 * | 2/2014 | Stephenson | B24B 5/06 451/450 |
| 2009/0221218 | A1 * | 9/2009 | Le Borgne | B24D 7/00 451/70 |
| 2012/0051857 | A1 | 3/2012 | Stephenson | |
| 2015/0231764 | A1 | 8/2015 | Arisawa et al. | |
| 2015/0306685 | A1 * | 10/2015 | Rakes | B24D 5/02 407/11 |

FOREIGN PATENT DOCUMENTS

| | | |
|---|---|---|
| JP | 58-143162 U | 9/1983 |
| JP | 2-126761 U | 10/1990 |
| JP | 5-269669 A | 10/1993 |
| JP | 7-237131 A | 9/1995 |
| JP | 2007-144597 A | 6/2007 |
| JP | 3166021 U | 1/2011 |
| JP | 2014-46368 A | 3/2014 |

OTHER PUBLICATIONS

Canadian Official Action dated Apr. 10, 2017 issued in corresponding Canadian Application No. 2,931,343.
International Preliminary Report on Patentability and Written Opinion dated Oct. 21, 2014 in the corresponding International Application No. PCT/JP2014/073728 with an English Translation.
International Search Report dated Oct. 21, 2014 in corresponding International Application No. PCT/JP2014/073728.

* cited by examiner

GRINDING WHEEL TOOL

TECHNICAL FIELD

The present invention relates to a grinding wheel tool.

BACKGROUND ART

A grinding wheel tool is formed by adhering many abrasive grains on an outer surface of a base having a disk or columnar shape or the like. The grinding wheel tool can grind a workpiece with certain amounts of depth of cut and feed being given to the workpiece while the base is rotating at a high speed. In such a grinding wheel tool, if the size of the abrasive grains is reduced in order to improve the surface roughness of the ground surface of the workpiece, chip pockets (pores) for discharging cutting chips are narrowed, so that clogging becomes likely to occur.

For this reason, for example, Patent Document 1 listed below or the like has proposed to form supply holes for supplying a grinding fluid in an outer surface of a base on which abrasive grains are adhered, and to send the grinding fluid out of the outer surface of the base to thereby suppress the occurrence of clogging.

PRIOR ART DOCUMENT

Patent Document

Patent Document 1: Japanese Patent Application Publication No. 2007-144597

SUMMARY OF THE INVENTION

Problems to be Solved by the Invention

However, in the grinding wheel tool described in Patent Document 1 or the like, when the amount of cutting chips to be generated per unit time is large as in the case of high-feed processing or the like, there is a possibility that clogging likewise occurs.

In view of this, an object of the present invention is to provide a grinding wheel tool capable of greatly suppressing the occurrence of clogging even when the amount of cutting chips to be generated per unit time is large as in the case of high-feed processing or the like.

Means for Solving the Problem

A grinding wheel tool according to a first aspect for solving the above-described problem is characterized in that the grinding wheel tool comprises:

a cylindrical head portion having a hollow portion penetrating inside; and abrasive grains adhered on an entire outer peripheral surface of the head portion, characterized in that a fluid is supplied into the hollow portion of the head portion, and a plurality of communication holes through which the hollow portion and an outer peripheral surface communicate with each other are formed in the head portion, each of the communication holes being inclined at an inclination angle from a radial direction of the head portion forward in a rotational direction thereof.

A grinding wheel tool according to a second aspect for solving the above-described problem is the grinding wheel tool according to the first aspect characterized in that each communication hole is such that the inclination angle smoothly increases toward the outer peripheral surface.

A grinding wheel tool according to a third aspect for solving the above-described problem is the grinding wheel tool according to the first aspect characterized in that each communication hole has a linear shape.

A grinding wheel tool according to a fourth aspect for solving the above-described problem is the grinding wheel tool according to the second aspect characterized in that each communication hole is inclined such that the communication hole is located closer to a front end of the head portion as extending toward an axis of the head portion.

A grinding wheel tool according to a fifth aspect for solving the above-described problem is the grinding wheel tool according to the third aspect characterized in that each communication hole is inclined such that the communication hole is located closer to a front end of the head portion as extending toward an axis of the head portion.

A grinding wheel tool according to a sixth aspect for solving the above-described problem is the grinding wheel tool according to the fourth aspect characterized in that each communication hole has a diameter size increasing toward an axis of the head portion.

A grinding wheel tool according to a seventh aspect for solving the above-described problem is the grinding wheel tool according to the fifth aspect characterized in that each communication hole has a diameter size increasing toward an axis of the head portion.

EFFECT OF THE INVENTION

According to the grinding wheel tool of the present invention, it is possible to greatly suppress the occurrence of clogging even when the amount of cutting chips to be generated per unit time is large as in the case of high-feed processing or the like.

BRIEF DESCRIPTION OF THE DRAWINGS

FIG. 2 is cross-sectional views of the grinding wheel tool in FIG. 1, Part (a) of which is a cross-sectional view taken along an axial direction, and Part (b) of which is a cross-sectional view taken along a radial direction of a head portion;

FIG. 4 is cross-sectional views of the grinding wheel tool in FIG. 3, Part (a) of which is a cross-sectional view taken along the axial direction, and Part (b) of which is a cross-sectional view taken along the radial direction of the head portion;

FIG. 5 is cross-sectional views of a grinding wheel tool according to Embodiment 2 of the present invention, Part (a) of which is a cross-sectional view taken along an axial direction, and Part (b) of which is a cross-sectional view taken along a radial direction of a head portion; and FIG. 6 is cross-sectional views for describing an operation of the grinding wheel tool according to Embodiment 2 of the present invention, Part (a) of which is a cross-sectional view taken along the axial direction, and Part (b) of which is a cross-sectional view taken along the radial direction of the head portion.

MODES FOR CARRYING OUT THE INVENTION

Hereinafter, grinding wheel tools according to Embodiments of the present invention will be described with reference to the drawings.

[Embodiment 1]

Figure 1:
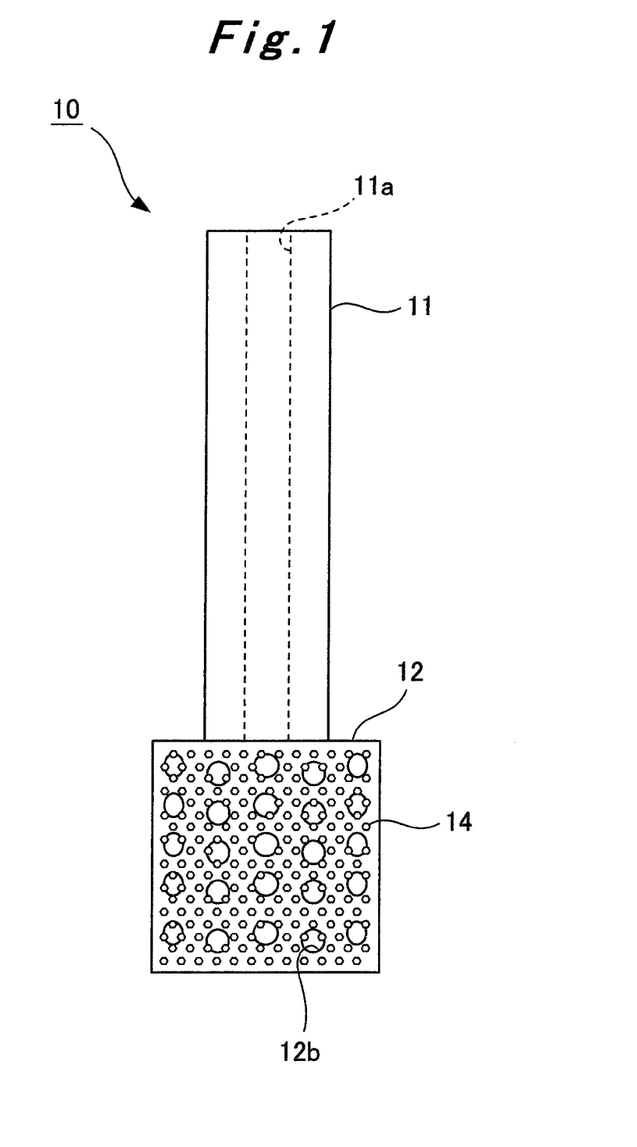
FIG. 1 is a schematic configuration view of a grinding wheel tool according to Embodiment 1 of the present invention.
Figures 2A, 2B:
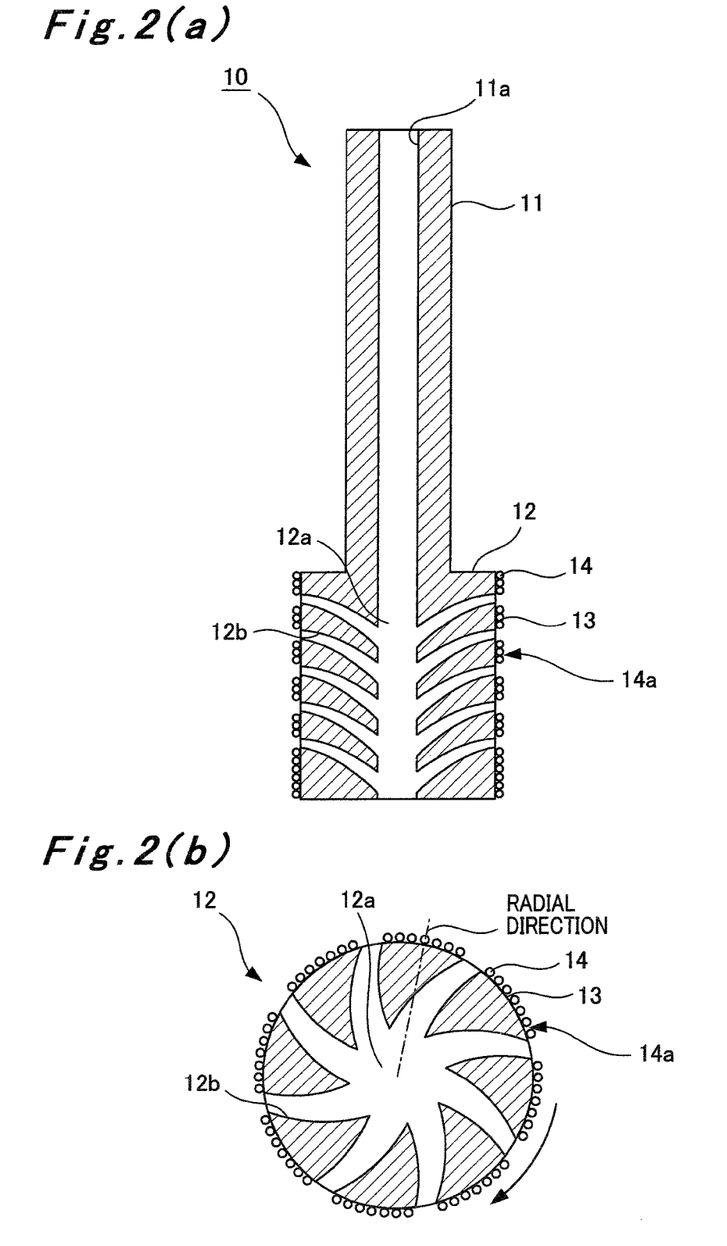

First, a grinding wheel tool according to Embodiment 1 of the present invention will be described with reference to FIGS. 1 and 2. FIG. 1 is a schematic configuration view of a grinding wheel tool 10 according to this embodiment. FIG. 2 is cross-sectional views of the grinding wheel tool 10 in FIG. 1, Part (a) of FIG. 2 is a cross-sectional view taken along an axial direction, and Part (b) of FIG. 2 is a cross-sectional view taken along a radial direction of a head portion As illustrated in FIG. 1 and Parts (a) and (b) of FIG. 2, the grinding wheel tool 10 according to this embodiment is formed such that a cylindrical head portion 12 having a hollow portion 12a penetrating therein is joined coaxially and integrally to a front end side (a lower side in FIG. 1 and Part (a) of FIG. 2) of a tubular shaft portion 11 having a passage hole 11a inside, and the hollow portion 12a is connected to the passage hole 11a of the shaft portion 11. The head portion 12 has a diameter larger than that of the shaft portion 11.

A plurality of communication holes 12b, through which the hollow portion 12a and an outer peripheral surface communicate with each other, are formed in the head portion 12 at predetermined intervals in a circumferential direction and the axial direction of the head portion 12.

As illustrated in Part (b) of FIG. 2, each of the communication holes 12b is directed in the radial direction of the head portion 12 (a long dashed short dashed line in Part (b) of FIG. 2 indicates one of the directions) at a boundary part with the hollow portion 12a (the side closest to the axis), but draws an arc that is inclined forward in a rotational direction (a rotational direction (of the grinding wheel tool 10) indicated by an arrow in Part (b) of FIG. 2) from the radial direction of the head portion 12, as extending from the boundary part toward the outer peripheral surface. In other words, each communication hole 12b is inclined at an inclination angle from the radial direction of the head portion 12 forward in the rotational direction, and the inclination angle smoothly increases toward the outer peripheral surface of the head portion 12.

In addition, as illustrated in Part (a) of FIG. 2, the communication hole 12b is located closer to the front end of the head portion 12 (the lower side in Part (a) of FIG. 2) as extending toward the axis of the head portion 12. In other words, the communication hole 12b has a helical shape.

Moreover, as illustrated in Parts (a) and (b) of FIG. 2, the communication hole 12b has a tapered shape in which the diameter size of the communication hole 12b increases toward the axis of the head portion 12.

Meanwhile, abrasive grains 14 are adhered on the entire outer peripheral surface of the head portion 12 with a bonding material 13 made of Ni plating by the electrodeposition method in such a manner as not to block the communication holes 12b. Note that in Parts (a) and (b) of FIG. 2, reference sign 14a denotes chip pockets (pores) between the abrasive grains 14.

Figure 3:
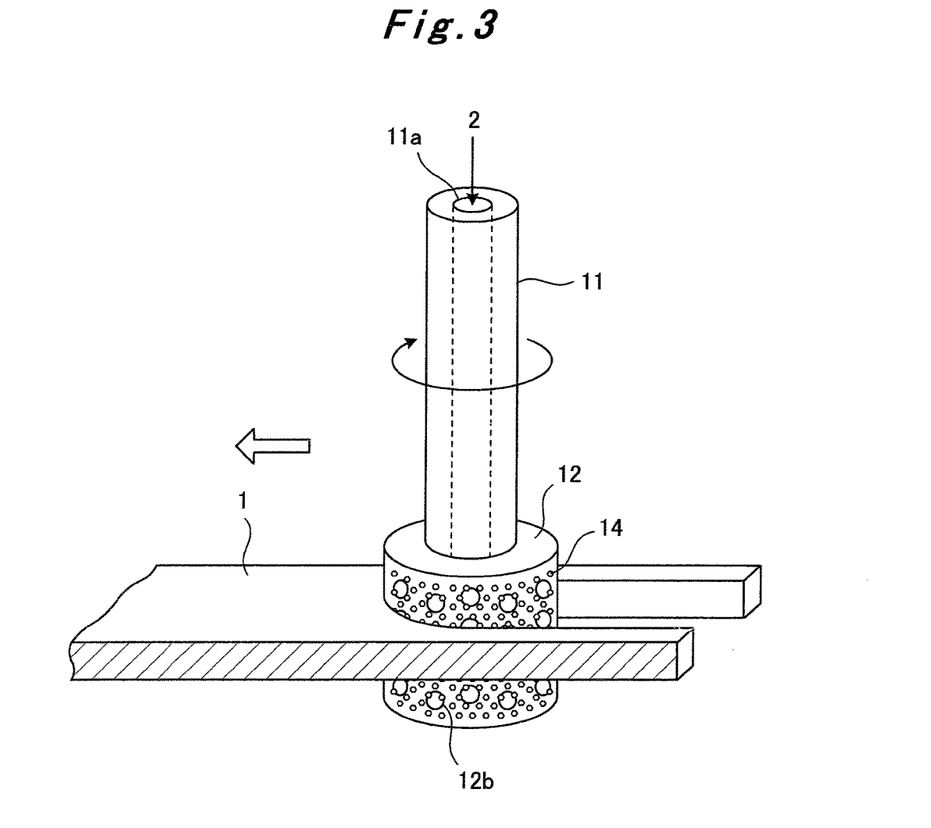
FIG. 3 is an operation explanatory view of the grinding wheel tool according to Embodiment 1 of the present invention.
Figure 4A:
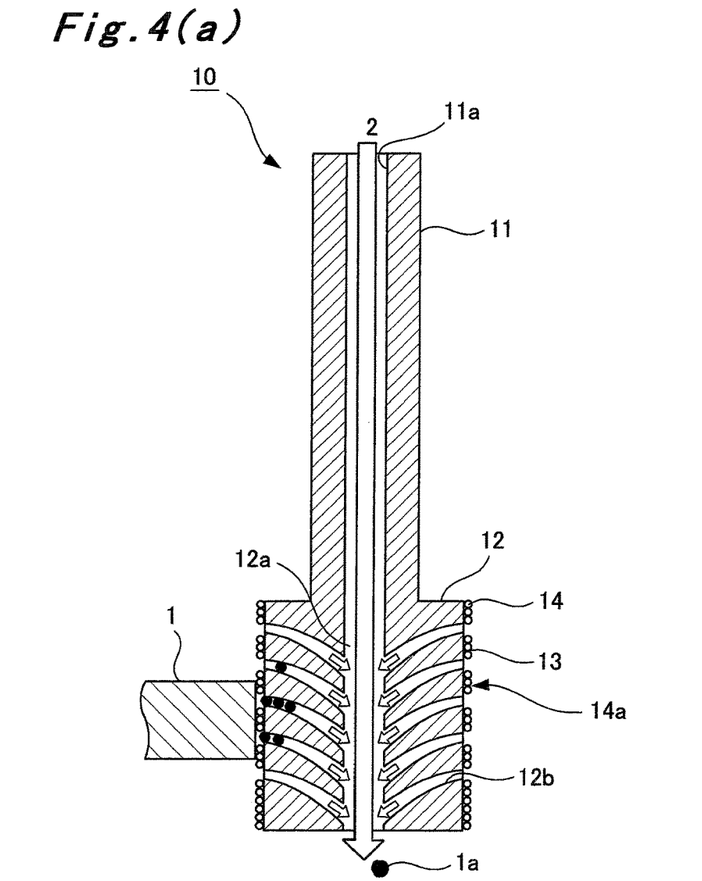
Figure 4B:
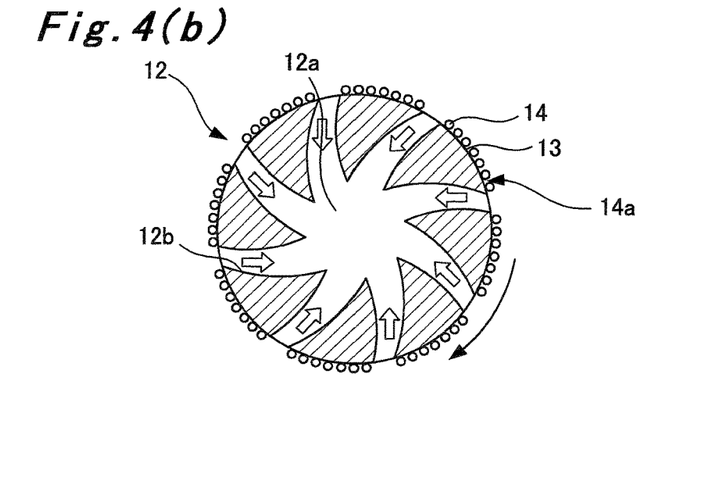

Here, FIG. 3 is an operation explanatory view of the grinding wheel tool 10 according to this embodiment. In addition, FIG. 4 is cross-sectional views of the grinding wheel tool 10 in FIG. 3, Part (a) of FIG. 4 is a cross-sectional view taken along the axial direction, and Part (b) of FIG. 4 is a cross-sectional view taken along the radial direction of the head portion.

In the grinding wheel tool 10 according to this embodiment, in which the abrasive grains 14 are adhered with the bonding material 13 on the base made of a metal (iron, maraging steel, or the like) including the shaft portion 11 and the head portion 12, particularly on the entire outer peripheral surface of the head portion 12 as described above, as illustrated in FIGS. 3 and 4, the head portion 12 is rotated at a high speed with the shaft portion 11, and a grinding fluid 2, which is a fluid, is supplied to an inside of the passage hole 11a in the shaft portion 11. At the same time, with certain amounts of depth of cut and feed being given to the workpiece 1, the grinding fluid 2 is separately supplied to a contact part with the workpiece 1. Accordingly, when the abrasive grains 14 is grinding the workpiece 1, the grinding fluid 2 supplied inside the passage hole 11a in the shaft portion 11 is then supplied to the hollow portion 12a in the head portion 12, flows through the hollow portion 12a to be discharged outside from the front end side of the head portion 12 (the lower side in FIG. 4).

In this event, the inside of the hollow portion 12a of the head portion 12 suctions the inside of the communication holes 12b due to the flow of the grinding fluid 2. Thus, the communication holes 12b in the head portion 12 suction therein cutting chips 1a generated from the workpiece 1 through the chip pockets 14a and sends the suctioned cutting chips 1a into the hollow portion 12a. The cutting chips 1a sent into the hollow portion 12a are then discharged outside together with the grinding fluid 2 from the front end side of the head portion 12.

In short, the grinding wheel tool 10 according to this embodiment is configured such that when the grinding wheel tool 10 is in contact with the workpiece 1 and is grinding the workpiece 1, the cutting chips 1a in the chip pockets 14a are suctioned into the communication holes 12b and sent out to the hollow portion 12a, and are discharged outside from the front end side of the head portion 12a.

For this reason, even when the size of the abrasive grains 14 is small and the chip pockets 14a is narrow, the grinding wheel tool 10 according to this embodiment can reliably send the cutting chips 1a to the hollow portion 12a without clogging the chip pockets 14a with the cutting chips 1a, and discharge the cutting chips 1a outside from the front end side of the head portion 12a.

Therefore, the grinding wheel tool 10 according to this embodiment can greatly suppress the occurrence of clogging even when the amount of cutting chips 1a to be generated per unit time is large as in the case of high-feed processing or the like.

In addition, in this embodiment, each communication hole 12b is inclined at the inclination angle from the radial direction of the head portion 12 forward in the rotational direction, and the inclination angle smoothly increases toward the outer peripheral surface of the head portion 12. Accordingly, it is possible to reliably send the cutting chips 1a out to the hollow portion 12a without clogging the communication holes 12b with the cutting chips 1a suctioned therein, and discharge the cutting chips 1a outside from the front end side of the head portion 12a, by utilizing rotational force of the grinding wheel tool 10.

Moreover, in this embodiment, since the communication holes 12b is located closer to the front end of the head portion 12 as extending toward the axis of the head portion 12, it is possible to greatly suppress the flowing of the grinding fluid 2 and the cutting chips 1a, which flow toward the front end in the hollow portion 12a, into the communication holes 12b.

Further, in this embodiment, since the communication holes 12b has a diameter size increasing toward the axis of the head portion 12, it is possible to more reliably send the cutting chips 1a out to the hollow portion 12a without clogging the communication holes 12b with the cutting chips 1a suctioned therein, and discharge the cutting chips 1a outside from the front end side of the head portion 12a.

Note that the taper ratio of the tapered shape and the inclination angle are desirably set at such values that the cutting chips 1a are more easily sent out to the hollow portion 12a hydrodynamically in consideration of the weight of the grinding wheel tool 10 and the rotational direction thereof at the time of grinding the workpiece 1. In the setting, although in the above description, the communication hole 12b is directed in the radial direction of the head portion 12 at the boundary part with the hollow portion 12a, the present invention is not limited to this, and also at the boundary part, the communication hole 12b may be inclined at an inclination angle from the radial direction of the head portion 12 forward in the rotational direction.

In addition, the base portion of the grinding wheel tool 10 according to this embodiment can be easily formed by using a three-dimensional stacking method. Since the design is made with a 3D-CAD in the three-dimensional stacking method, the base portion can be easily formed even when the number of the communication holes 12b is large. After the base portion is formed, the grinding wheel tool 10 according to this embodiment can be manufactured by adhering the abrasive grains 14 with the bonding material 13 by the electrodeposition method. Note that the electrodeposition method is desirable performed such that the abrasive grains 14 are not adhered inside the communication holes 12b; however, there is no problem even if the abrasive grains 14 are adhered inside the communication holes 12b.

The above is the description of the grinding wheel tool according to Embodiment 1 of the present invention.

[Embodiment 2]

A grinding wheel tool according to Embodiment 2 of the present invention is obtained by changing the shapes of the passage hole, the hollow portion, and the communication holes of the grinding wheel tool according to Embodiment 1 of the present invention. Hereinafter, the description of parts common to the grinding wheel tool according to Embodiment 1 of the present invention is partially omitted.

Figure 5A:
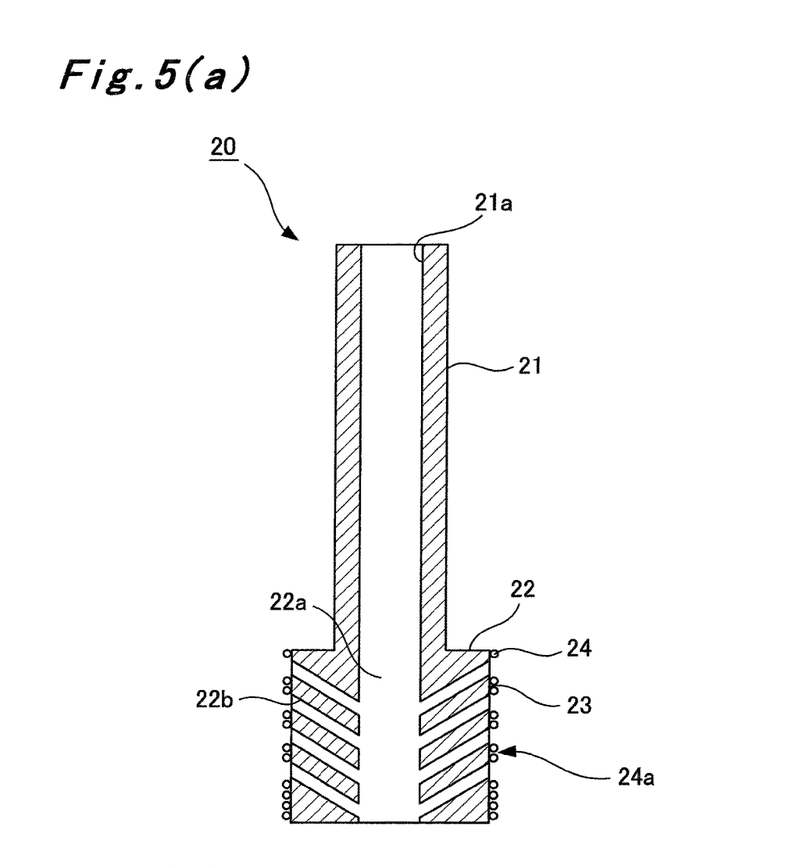
Figure 5B:
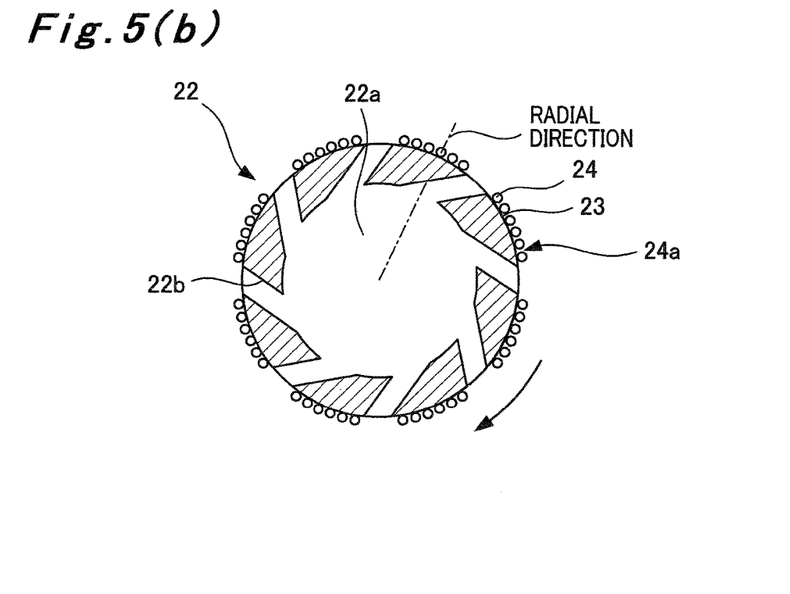
Figure 6A:
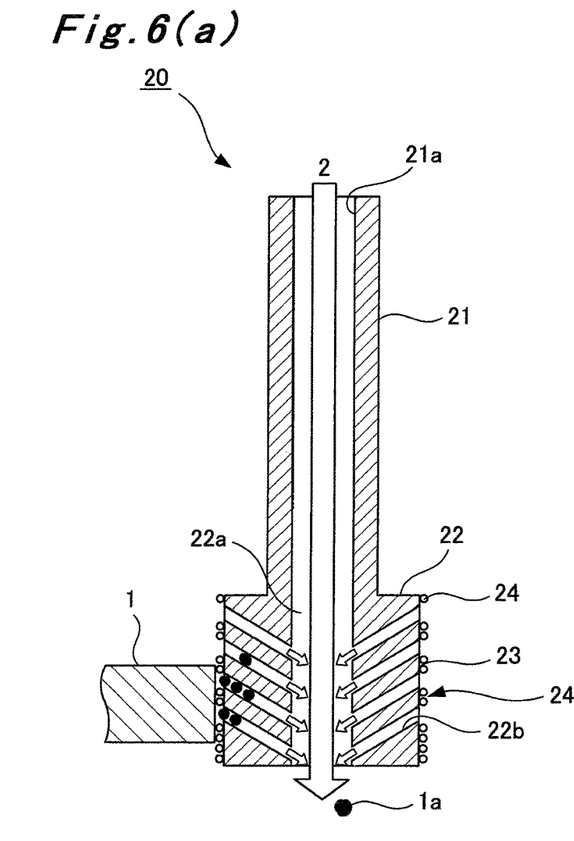

The grinding wheel tool according to Embodiment 2 of the present invention will be described with reference to FIGS. 5 and 6. FIG. 5 is cross-sectional views of a grinding wheel tool 20 according to this embodiment, Part (a) of FIG. 5 is a cross-sectional view taken along an axial direction, and Part (b) of FIG. 5 is a cross-sectional view taken along a radial direction of a head portion. FIG. 6 is cross-sectional views for describing an operation of the grinding wheel tool according to this embodiment, Part (a) of FIG. 6 is a cross-sectional view taken along the axial direction, and Part (b) of FIG. 6 is a cross-sectional view taken along the radial direction of the head portion.

In this embodiment, as illustrated in Part (a) of FIG. 5, each of communication holes 22b is located closer to a front end of a head portion 12 (a lower side in Part (a) of FIG. 5) as extending toward an axis of the head portion 22. In addition, as illustrated in Part (b) of FIG. 5, the communication hole 22b has a linear shape inclined at an inclination angle from a radial direction of the head portion 22 forward in a rotational direction (a rotational direction (of the grinding wheel tool 20) indicated by an arrow in Part (b) of FIG. 5).

Note that the communication holes 22b in this embodiment are different from the communication holes 12b in Embodiment 1 in that the inclination angle does not change from the outer peripheral surface side to the axis side of the head portion 22. For this reason, the diameter sizes of the hollow portion 22a inside the head portion 22 and the passage hole 21a inside the shaft portion 21 in this embodiment are naturally larger than the diameter sizes of the hollow portion 11a and the passage hole 11a in Embodiment 1.

In the grinding wheel tool 20 according to this embodiment, in which the abrasive grains 24 are adhered with the bonding material 23 on the base made of a metal (iron, maraging steel, or the like) including the shaft portion 21 and the head portion 22, particularly on the entire outer peripheral surface of the head portion 22 as described above, as illustrated in FIG. 6, the head portion 22 is rotated at a high speed with the shaft portion 21, and a grinding fluid 2, which is a fluid, is supplied to an inside of the passage hole 21a in the shaft portion 21. At the same time, with certain amounts of depth of cut and feed being given to the workpiece, the grinding fluid 2 is separately supplied to a contact part with the workpiece 1. Accordingly, when the abrasive grains 24 is grinding the workpiece 1, the grinding fluid 2 supplied inside the passage hole 21a in the shaft portion 21 is then supplied to the hollow portion 22a in the head portion 22, flows through the hollow portion 22a to be discharged outside from the front end side of the head portion 22 (the lower side in FIG. 6).

In this event, the inside of the hollow portion 22a of the head portion 22 suctions the inside of the communication holes 22b due to the flow of the grinding fluid 2. Thus, the communication holes 22b in the head portion 22 suctions therein cutting chips 1a generated from the workpiece 1 through chip pockets 24a and sends the suctioned cutting chips 1a into the hollow portion 22a. The cutting chips 1a sent into the hollow portion 22a are then discharged outside together with the grinding fluid 2 from the front end side of the head portion 22.

In short, the grinding wheel tool 20 according to this embodiment is configured such that when the grinding wheel tool 20 is in contact with the workpiece 1 and is grinding the workpiece 1, the cutting chips 1a in the chip pockets 24a are suctioned into the communication holes 22b and sent out to the hollow portion 22a, and are discharged outside from the front end side of the head portion 22a.

For this reason, even when the size of the abrasive grains 24 is small and the chip pockets 24a is narrow, the grinding wheel tool 20 according to this embodiment can reliably send the cutting chips 1a out to the hollow portion 22a without clogging the chip pockets 24a with the cutting chips 1a, and discharge the cutting chips 1a outside from the front end side of the head portion 22a. Moreover, since the cutting chips la are taken inside, it is possible to suppress the scattering of the cutting chips 1a.

Therefore, the grinding wheel tool 20 according to this embodiment can greatly suppress the occurrence of clogging even when the amount of cutting chips 1a to be generated per unit time is large as in the case of high-feed processing or the like .

In addition, in this embodiment, each communication hole 22b has the linear shape inclined at the inclination angle from the radial direction of the head portion 22 forward in the rotational direction. For this reason, it is possible to reliably send the cutting chips 1a out to the hollow portion 12a, and discharge the cutting chips 1a outside from the front end side of the head portion 12a, by utilizing rotational force of the grinding wheel tool 20.

Moreover, in this embodiment, since the communication holes 22b is located closer to the front end of the head portion 22 as extending toward the axis of the head portion 22, it is possible to greatly suppress the flowing of the grinding fluid 2 and the cutting chips 1a, which flow toward the front end side in the hollow portion 22a, into the communication holes 22b.

Note that the inclination angle of the linear shape described above is desirably set at such a value that the cutting chips 1a are more easily sent out to the hollow portion 22a hydrodynamically in consideration of the weight of the grinding wheel tool 20 and the rotational direction thereof at the time of grinding the workpiece 1. In addition, the communication hole 22b may have a tapered shape in which the diameter size of the communication hole 22b increases toward the outer peripheral surface of the head portion 22, like the communication holes 12b of Embodiment 1. This makes it possible to suppress the entering of the cutting chips 1a, which have been accumulated in the communication holes 22b, into the hollow portion 22a, and to reliably discharge the cutting chips 1a accumulated in the communication holes 22b without clogging the communication holes 22b with the cutting chips 1a.

In addition, the base portion of the grinding wheel tool 20 according to this embodiment may be formed by machining . Then, after the base portion is formed, the grinding wheel tool 20 according to this embodiment can be manufactured by adhering abrasive grains 24 with a bonding material 23 by the electrodeposition method.

The above is the description of the grinding wheel tool according to Embodiment 2 of the present invention.

Note that although in Embodiments 1, 2, the cases of the grinding wheel tools 10, 20 having the head portions 12, 22 with larger diameters than the shaft portion 11 are described, the present invention is not limited to this. Even with a grinding wheel tool having a head portion with a diameter equal to or smaller than that of a shaft portion, the same operations and effects as those of Embodiments 1, 2 can be achieved.

In addition, although in Embodiments 1, 2, the grinding fluid 2 is used, the present invention is not limited to this. For example, it is also possible to use another liquid such as water and a gas such as air. Moreover, in Embodiments 1, 2, the grinding fluid 2 is separately supplied to the communication holes 12b, 22b. However, since the cutting chips 1a on the surface side push out the preceding cutting chips 1a to the hollow portion 12a, even when nothing is supplied to the communication holes 12b, 22b, the same operations and effects as those of Embodiments 1, 2 can be achieved.

The grinding wheel tools according to the present invention have been described so far. In other words, a grinding wheel tool according to the present invention includes: a cylindrical head portion having a hollow portion penetrating inside; and abrasive grains adhered on an entire outer peripheral surface of the head portion, in which a fluid is supplied into the hollow portion of the head portion, and a plurality of communication holes through which the hollow portion and the outer peripheral surface communicate with each other are formed in the head portion, each of the communication holes being inclined at an inclination angle from a radial direction of the head portion forward in a rotational direction thereof. With this configuration, the grinding wheel tool according to the present invention can greatly suppress the occurrence of clogging even when the amount of cutting chips to be generated per unit time is large as in the case of high-feed processing or the like.

INDUSTRIAL APPLICABILITY

Since the grinding wheel tool according to the present invention can greatly suppress the occurrence of clogging even when the amount of cutting chips to be generated per unit time is large as in the case of high-feed processing or the like, the grinding wheel tool according to the present invention can be quite beneficially utilized in the metalworking industry and the like.

REFERENCE SIGNS LIST

1 WORKPIECE
1a CUTTING CHIP
2 GRINDING FLUID
10, 20 GRINDING WHEEL TOOL
11, 21 SHAFT PORTION
11a, 21a PASSAGE HOLE
12, 22 HEAD PORTION
12a, 22a HOLLOW PORTION
12b, 22b COMMUNICATION HOLE
13, 23 BONDING MATERIAL
14, 24 ABRASIVE GRAIN
14a, 24a CHIP POCKET (PORE)

The invention claimed is:

1. A grinding wheel tool, the grinding wheel tool comprises:
   a cylindrical head portion having a hollow portion penetrating inside; and
   abrasive grains adhered on an entire outer peripheral surface of the head portion,
   wherein the hollow portion is coaxial with the head portion and is configured to allow a fluid supplied from a shaft portion side to flow inside the hollow portion to be discharged outside from the head portion side, and
   a plurality of communication holes through which the hollow portion and said outer peripheral surface communicate with each other are formed in the head portion, each of the communication holes being inclined at an inclination angle from a radial direction of the head portion forward in a rotational direction thereof and configured to suction therein cutting chips generated during processing.

2. The grinding wheel tool according to claim 1, wherein each communication hole is such that the inclination angle smoothly increases toward the outer peripheral surface.

3. The grinding wheel tool according to claim 2, wherein each communication hole is inclined such that the communication hole is located closer to a front end of the head portion as extending toward an axis of the head portion.

4. The grinding wheel tool according to claim 3, whereineach communication hole has a tapered shape in which a diameter size of the communication hole increases toward an axis of the head portion.

5. The grinding wheel tool according to claim 1, wherein each communication hole has a linear shape.

6. The grinding wheel tool according to claim 5, wherein each communication hole is inclined such that the communication hole is located closer to a front end of the head portion as extending toward an axis of the head portion.

7. The grinding wheel tool according to claim 5, wherein each communication hole has a tapered shape in which a diameter size of the communication hole increases toward an axis of the head portion.

* * * * *